United States Patent [19]

Kurawaki et al.

[11] Patent Number: 5,248,012

[45] Date of Patent: Sep. 28, 1993

[54] DETACHABLE FRAME FOR MOTORCYCLE

[75] Inventors: Ichiro Kurawaki; Toyoji Tanaka, both of Iwata, Japan

[73] Assignee: Yamaha Hatsudoki Kabushiki Kaisha, Iwata, Japan

[21] Appl. No.: 757,843

[22] Filed: Sep. 11, 1991

[51] Int. Cl.5 ............................................. B62K 11/04
[52] U.S. Cl. ..................................... 180/219; 180/298
[58] Field of Search ................ 180/219, 228, 298, 294

[56] References Cited

U.S. PATENT DOCUMENTS

| | | | |
|---|---|---|---|
| 4,461,366 | 7/1984 | Honda | 180/229 |
| 4,523,655 | 6/1985 | Keenan et al. | 180/294 |
| 4,660,854 | 4/1987 | Suzuki et al. | 280/782 |
| 4,721,179 | 1/1988 | Yamaguchi et al. | 180/219 |
| 4,775,025 | 10/1988 | Parker et al. | 180/219 |
| 4,799,569 | 1/1989 | Hattori et al. | 180/219 |
| 4,805,716 | 2/1989 | Tsunoda et al. | 180/228 |
| 4,828,069 | 5/1989 | Hatsuyama | 180/219 |

FOREIGN PATENT DOCUMENTS

| | | | |
|---|---|---|---|
| 0095997 | 4/1990 | Japan | 180/219 |
| 2191158 | 12/1987 | United Kingdom | 180/219 |

OTHER PUBLICATIONS

European Search Report—91 11 6050—dated Jun. 17, 1992.

Primary Examiner—Margaret A. Focarino
Assistant Examiner—Florian Zeender
Attorney, Agent, or Firm—Ernest A. Beutler

[57] ABSTRACT

A motorcycle having leading and trailing front and rear arm suspensions for the front and rear wheels. The motorcycle has a frame that is made up of a pair of side pieces that are integrally connected with each other with portions of the side pieces removeable for accessing and removal of the engine.

11 Claims, 3 Drawing Sheets

DETACHABLE FRAME FOR MOTORCYCLE

BACKGROUND OF THE INVENTION

This invention relates to a detachable frame for a motorcycle and more particularly to a frame construction for a motorcycle having a detachable member for affording access to the engine of the motorcycle.

As is well known, motorcycles are extremely compact assemblies. Normally the motorcycle has a frame assembly that suspends both the front and rear wheels, carries the engine and also carries a seat for the rider. Because of the compact nature of motorcycles and also the high speeds and stresses to which they are attributed, it is desirable for the frame to be not only light but also strong and extremely rigid. However, if the frame is made up of a number of members that are rigidly connected to each other and which have sufficient rigidity, then the accessibility of certain components such as the engine may be deteriorated. With conventional motorcycle frame constructions, it is frequently difficult to access the engine for servicing or to remove it.

These problems are particularly acute with a type of motorcycle that employs a trailing arm suspension for the rear wheel and a leading arm suspension for the front wheel. Such motorcycles have the arm suspension members positioned low in the frame and hence employ a sub-frame assemblage that is normally comprised of a pair of spaced apart side members that are integrally connected by means of a plurality of cross braces. These frames are required to provide the requisite support for the pivot points of the front and rear wheel suspensions. Obviously, accessibility of the engine with such frames is extremely difficult.

It is, therefore, a principal object to this invention to provide an improved frame construction for a motorcycle.

It is further object to this invention to provide a motorcycle frame construction that is made up of at least one detachable member that can be readily detached for accessibility of the engine for servicing without weakening the overall frame construction.

It is a further object to this invention to provide an improved frame construction for a motorcycle of the type having arm front and rear wheel suspensions and wherein the frame assembly facilitate ease of servicing of the engine.

SUMMARY OF THE INVENTION

This invention is adapted to be embodied in a motorcycle that is comprised of a frame assembly, a front wheel dirigibly supported by the frame assembly and a rear wheel supported by the frame assembly. An internal combustion engine is supported by the frame assembly and drives transmission means for driving the rear wheel. The frame assembly includes a member extending along a side of the engine and obstructing the engine. In accordance with the invention, this member is detachable from the remainder of the frame for rendering the engine more accessible.

BRIEF DESCRIPTIONS OF THE DRAWINGS

DETAILED DESCRIPTION OF THE PREFERRED EMBODIMENT OF THE INVENTION

Figure 1:
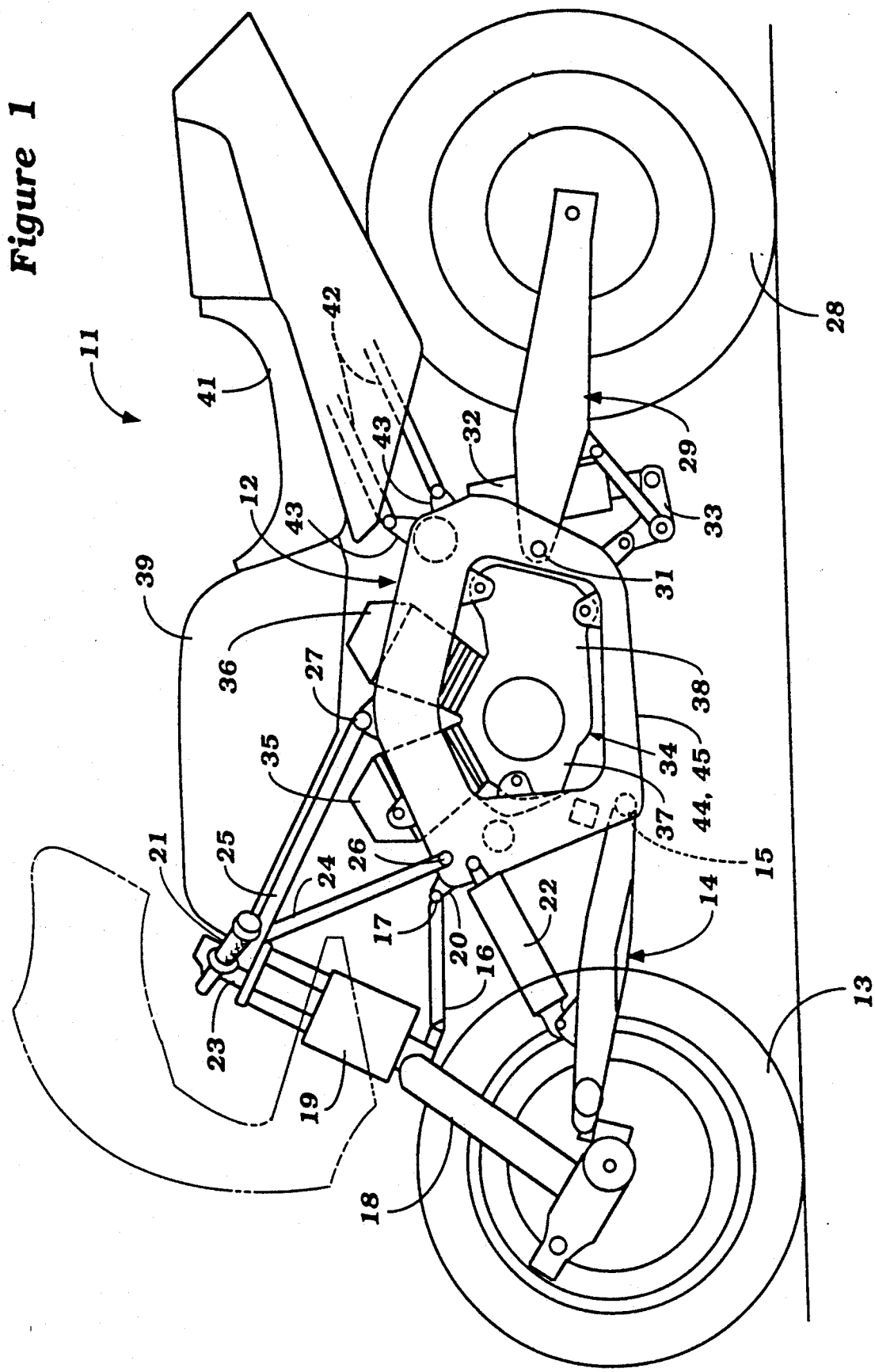
FIG. 1 is a side elevational view of a motorcycle constructed in accordance with an embodiment of the invention.
Figure 2:
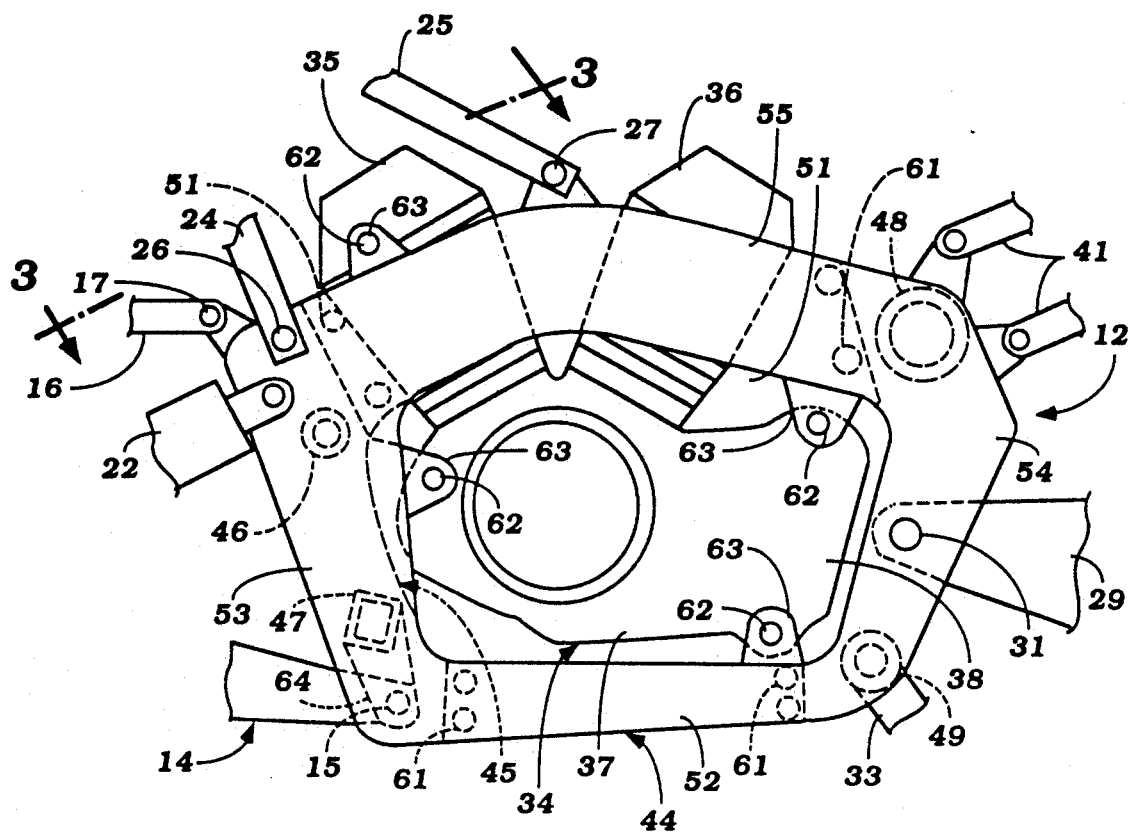
FIG. 2 is an enlarged side view of the portion of the motorcycle showing the frame construction.
Figure 3:
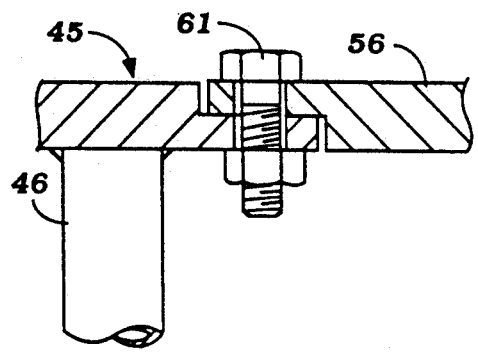
FIG. 3 is a cross sectional view taken along the line 3—3 of FIG. 2.

Referring now in detail to the drawings and initially primarily to FIG. 1, a motorcycle constructed in accordance with an embodiment of the invention is identified generally by the reference numeral 11. The motorcycle 11 has a frame, comprised of a main frame assemblage, indicated generally by the reference numeral 12 and which has a construction as will be described later by reference to the remaining figures.

A front wheel 13 is dirigibly supported by the main frame member 12 by means of a leading arm 14 that has a pair of spaced apart rear pivot joints 15 that are carried by the frame member 12 in a manner to be described. An upper arm assembly 16 also has a pivotal connection 17 to a bracket 20 of the main frame member 12 and the upper and lower arms, 16 and 14 are connected to a hub carrier or king pin 18 that rotatably journals the front wheel 13 and which is also steerable relative to the arms 14 and 16.

A front suspension element 19 carries the upper end of the king pin 18 and connects it to a handle bar assembly 21 for steering movement of the front wheel 13 by the handle bar assembly 21. A universal joint is provided in the connection between the handle bar assembly 21 and the king pin or hub carrier 18 so as to accommodate the suspension movement of the front wheel 13.

A combined spring shock absorber assembly 22 is loaded between the lower arm 14 and the main frame member 12.

The handle bar assembly 21 is carried by the frame assembly by means of a head pipe 23 that is carried by pairs of angularly disposed stays 24 and 25 which are connected to the main frame member 12 and which form portions of the frame by means of lower joints 26 and 27, respectively.

A rear wheel 28 is rotatably journalled at the rear end of a trailing arm 29 in a known manner. The trailing arm 29 is pivotally supported at its forward end by means of a pair of spaced apart pivot bolts 31 that are affixed in a suitable manner to the main frame member 12.

A suspension element 32 comprised of a spring and shock absorber assembly is connected at its upper end in a suitable manner to the main frame member 12. A linkage system 33 is connected between the trailing arm 29, main frame member 12 and the opposite end of the suspension element 32 for loading the suspension element upon pivotal movement of the trailing arm 29.

The motorcycle 11 is powered by an internal combustion engine, indicated generally by the reference numeral 34 that is supported within the main frame member 12 in a manner to be described. In the illustrated embodiment, the engine 34 is comprised of a V-2 engine having a forwardly extending cylinder block 35 and a rearwardly extending cylinder block 36, each of which support respective pistons. Of course, the invention can be employed in conjunction with other types of engines and since the engine itself forms no part of the invention, a more detailed description of it is believed to be unnecessary.

The engine 34, as is typical with motorcycle practice, has a combined crankcase transmission assembly 37 formed below the cylinder banks 35 and 36 and which not only rotatably journals the crankshaft for the engine, but also contains a change speed transmission, shown partially at 38, which drives a suitable arrangement for driving the rear wheel 28. This may be either a chain or shaft drive.

A fuel tank 39 is supported at the upper portion of the frame assembly above the main frame member 12 and supplies fuel to the engine 34 in a known manner. A seat 41 is carried to the rear of the fuel tank 39 by means of pairs of seat rails 42 that are affixed to lugs 43 of the main frame member 12.

Referring now primarily to the remaining figures, the construction of the main frame member 12 will be described in detail. The main frame member 12 is comprised of a pair of plate type side pieces 44 and 45 which, in conventional constructions, would be identical. These side pieces 44 and 45 are integrally connected to each other by means of a plurality of cross braces or cross members 46, 47, 48 and 49. The side piece 44 and the side piece 45, in a conventional construction, is of a generally pentagonal shape construction with an open center 51. This is comprised of a lower leg 52, a pair of generally angularly and outwardly inclined side legs 53 and 54 and a inverted V-shaped top member 55. This construction provides an extremely rigid arrangement but, however, because of its configuration it encloses and conceals substantial portions of the engine 34. This can make servicing of the engine 34 extremely difficult since access to components such as the carburetors, valve mechanism, etcetera for periodic adjustment can be difficult at best to access. In addition, it is very difficult, with conventional constructions, to remove the engine assembly 34 for servicing.

In accordance with the invention, the side piece 45 has detachable members 56 and 57 which form the central portions of the upper and lower legs, 55 and 52, respectively. The detachable members 56 and 57 have grooved edges 58 that are received within complementary grooves 59 formed in the remaining portion of the side piece 45 so as to insure a rigid connection therebetween. Bolt and nut fasteners 61 serve to attach the removal members 56 and 57 to the rest of the side piece 45. By removal of the removable members 56 and 57, the engine 34 may be easily removed from the side of the motorcycle while the remainder of the motorcycle may in fact be kept completely intact and, in fact, can even stand on its own wheels while this removal is taking place. As a result of this, servicing is greatly facilitated and, at the same time, no sacrifice on strength is made.

Figure 4:
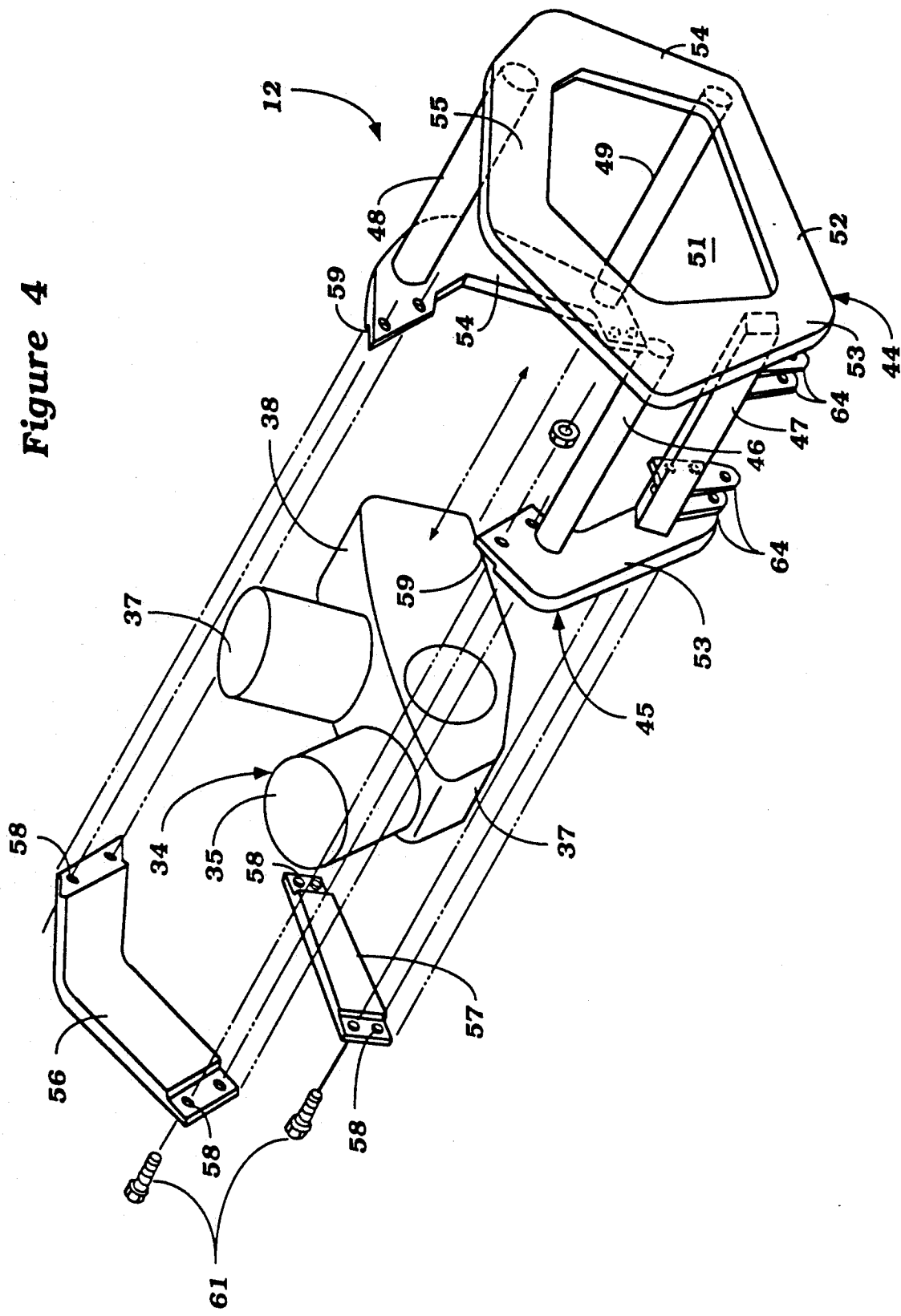
FIG. 4 is a partially exploded view showing the frame assembly and the detachability of certain members for removal of the engine and transmission assembly.

The engine 34 is mounted within the frame assembly and specifically the main frame member 12 by means of a plurality of mounts 62 that are received in lugs 63 attached to the remainder of the frame member 12. In FIG. 4, the mounting lugs 64 for the lower front suspension pivots 15 also appear.

It should be readily apparent from the foregoing description that the described motorcycle frame arrangement permits an extremely strong frame and yet one which offers easy access to the engine for servicing. Of course, the foregoing description is that of a preferred embodiment of the invention and various changes and modifications may be made without departing from the spirit and scope of the invention, and defined by the appended claims.

We claim:

1. A motorcycle comprised of a frame assembly comprised of a pair of plate type side pieces integrally connected to each other, a front wheel dirigibly supported by said frame assembly by front wheel suspension and steering means including a front suspension arm pivotally connected to said frame assembly, a handle bar assembly journalled for steering movement by said frame assembly about a steering axis, means for connecting said handle bar assembly to said front wheel for steering of said front wheel and a cushioning element interposed between said suspension arm and said frame assembly for cushioning the suspension movement of said front wheel, a rear wheel supported by said frame assembly by means of a rear suspension arm pivotally connected to said frame assembly, and an internal combustion engine supported by said frame assembly and driving transmission means for driving said rear wheel, at least one of said side pieces of said frame assembly including a member extending along a side of said engine and obstructing said engine, said member being detachably connected to the remainder of said frame assembly for accessing the part of the engine obscured by said member by removal of said member without necessitating removal of any connection of any component of said front wheel suspension and steering means or the connection of said rear suspension arm to said frame assembly.

2. A motorcycle as set forth in claim 1 wherein the engine is removable from the frame assembly upon removal of the member.

3. A motorcycle as set forth in claim 1 wherein the side pieces are integrally connected with each other by means of cross members.

4. A motorcycle as set forth in claim 3 wherein each of the side pieces has a generally open configuration comprised of a top portion, a bottom portion and side portions interconnecting the adjacent sides of the top and bottom portions to define the open area therebetween.

5. A motorcycle as set forth in claim 4 wherein the removable member comprises at least one of the top and bottom portions of one side piece.

6. A motorcycle as set forth in claim 5 wherein the engine is removable from the frame assembly upon removal of the member.

7. A motorcycle as set forth in claim 1 wherein the suspension for the front wheel comprises a suspension element having an operative pivotal connection at one end thereof to the front suspension arm and an operative pivotal connection at the other end thereof to the side piece of the frame member that does not have the removable member.

8. A motorcycle as set forth in claim 7 wherein the removable member comprises at least one of the top and bottom portions of the one side piece.

9. A motorcycle as set forth in claim 3 wherein the suspension for the front wheel comprises a suspension element having an operative pivotal connection at one end thereof to the front suspension arm and an operative pivotal connection at the other end thereof to the side piece of the frame member that does not have the removable member.

10. A motorcycle as set forth in claim 9 wherein the removable member comprises at least one of the top and bottom portions of the one side piece.

11. A motorcycle as set forth in claim 5 wherein the suspension for the front wheel comprises a suspension element having an operative pivotal connection at one end thereof to the front suspension arm and an operative pivotal connection at the other end thereof to the side piece of the frame member that does not have the removable member.

* * * * *